United States Patent Office 2,781,925
Patented Feb. 19, 1957

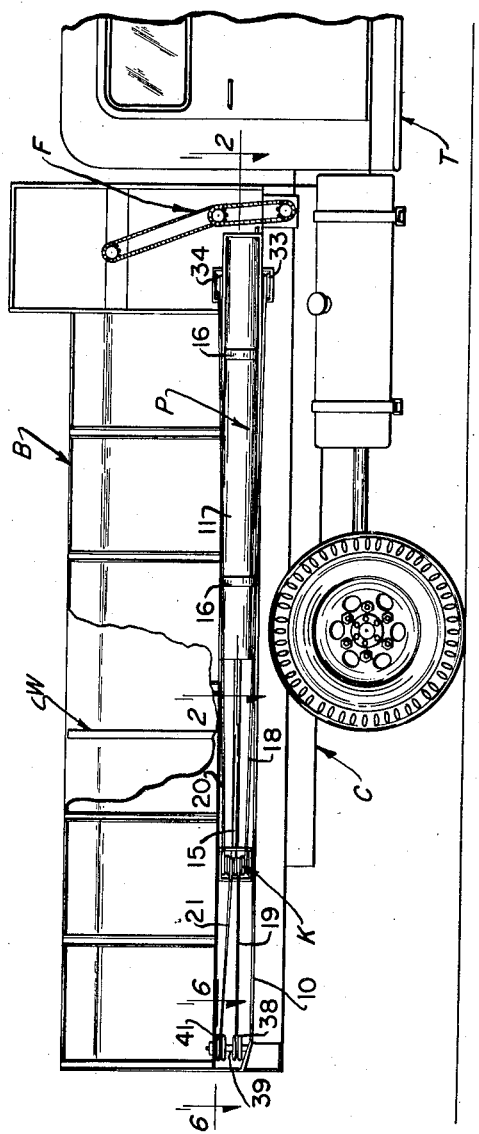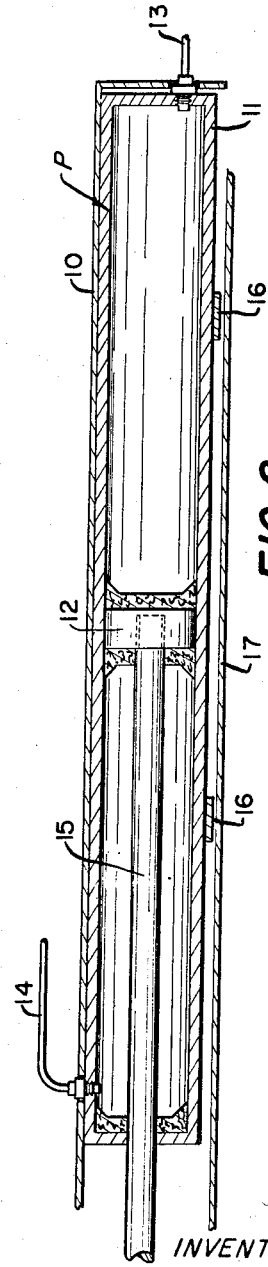

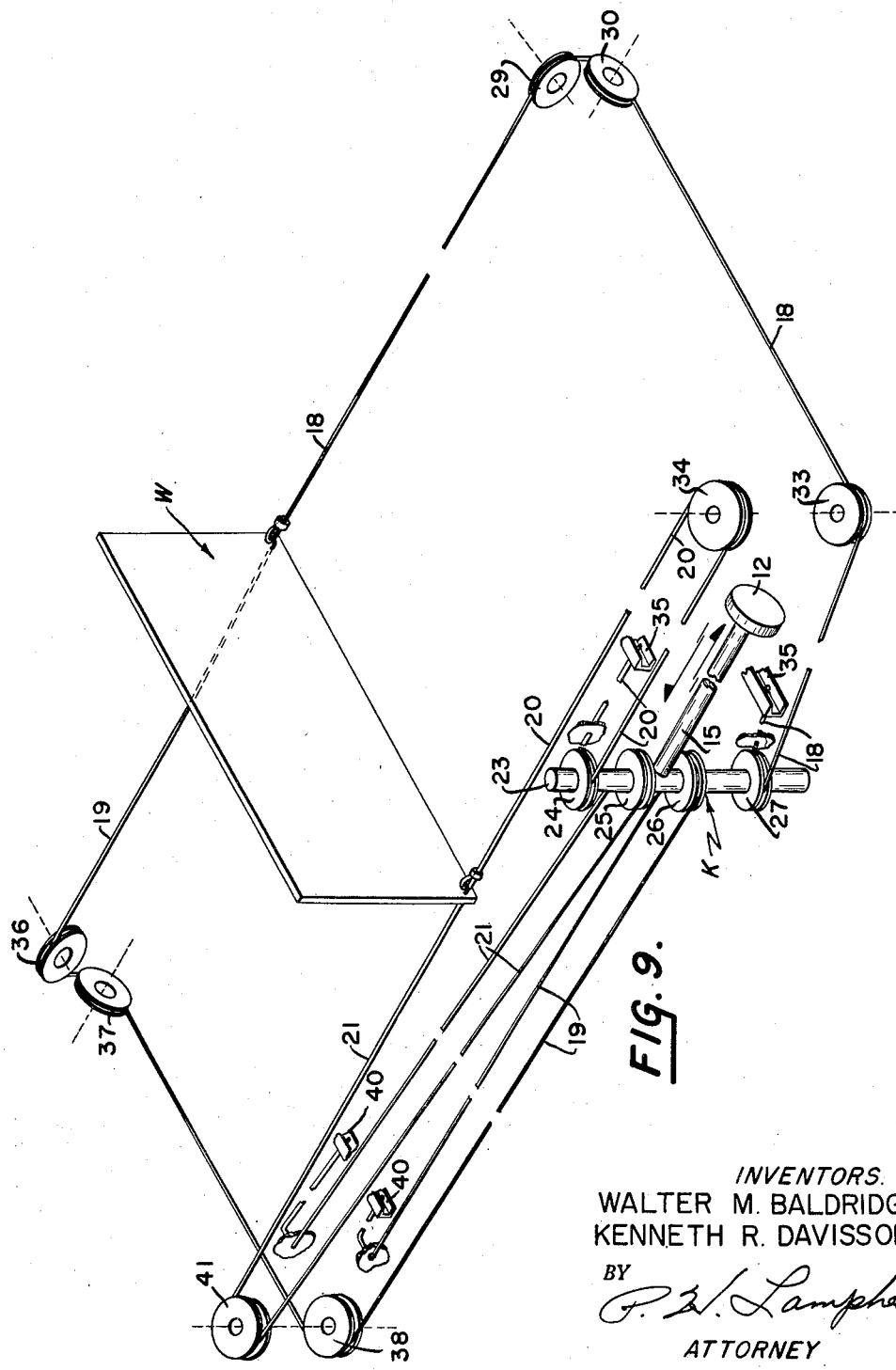

2,781,925

POWER OPERATED UNLOADING APPARATUS FOR TRUCK BODIES

Walter M. Baldridge and Kenneth R. Davisson, Severance, Colo.

Application January 27, 1954, Serial No. 406,524

2 Claims. (Cl. 214—82)

This invention relates to vehicles such as automobile trucks and more particularly to the bodies thereof and means for unloading material carried by said bodies.

One of the objects of our invention is to produce an improved unloading means for material in a container such as a body of an automobile truck and more particularly means which will cause a shoving of the material.

Another object is to produce in a container such as a truck body a movable wall or gate which will be caused to move longitudinally in either direction of the body by power means so that material in the body can be caused to be discharged at either end of the body.

Still another object is to produce improved fluid pressure operated power means for moving the wall or end gate as desired.

A further object is to accomplish the moving of the wall or end gate by a single fluid pressure operated power cylinder positioned on one side of the container such as the truck body where it will be readily accessible.

A still further and more specific object is to produce means for moving a wall in a material container which will involve only a single fluid operated cylinder and piston so connected by cables and sheaves that the wall will be caused to move more units of distance than that of the piston and with a proportional increase in power transmitted from the piston to the wall.

Other objects of our invention will become apparent from the following description taken in connection with the accompanying drawings in which:

Figure 1 is a side view of a vehicle truck body provided with a movable wall or end gate therein which has its movement controllable by a fluid pressure operated system embodying our invention, said view having certain parts broken away or removed to disclose details;

Figure 2 is a sectional view taken on the line 2—2 of Figure 1 showing the fluid pressure operating parts and the manner of mounting in the side of the truck body;

Figure 9 is a schematic view showing the overall method of operation of the movable wall or end gates including the essential parts of the fluid pressure unit, the sheaves, and the cables and their arrangement.

Figure 4:
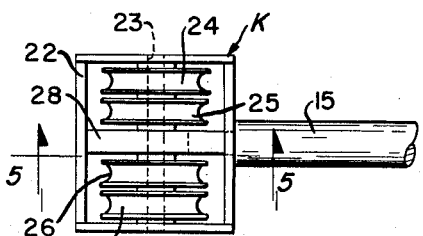
Figure 4 is an enlarged view of the sheave block carried by the end of the piston rod.

Referring now to the drawings in detail and first to Figure 1, there is disclosed by way of example an automobile truck body with which our invention is associated, but it is to be understood the invention may be employed with any material container besides a truck body to move a wall therein and thus cause the material to be moved. The truck body is indicated generally by the letter B, such being mounted on a chassis C of the truck T. The body or material container is arranged to carry any type of material and is provided with a movable wall or so-called end gate W whereby material in the body can be moved in the body toward either end thereof. If the wall is at the rear end of the body, then any material forward thereof can be pushed toward the front end of the body if the wall W moves in that direction. Such movement may be desired if the body is provided with a front end mixer and side delivery feeder F, as is the disclosed body B. If the wall W is at the forward end of the body and the body is filled with material, it may be desired to unload the material at the rear end of the body and this can be accomplished by moving the wall rearwardly.

As shown in Figure 1, the chassis C of the truck has mounted thereon side channels 10 (one side only being shown) acting as longitudinal supports on which the body B is mounted. In the particular structure shown for controlling movement of the wall W in either direction, the channel on the right hand side of the truck is employed as a member for receiving and carrying the power device P for accomplishing the moving of the wall.

This power device is preferably fluid pressure actuated and comprises a cylinder 11 having therein a piston 12. The fluid can be either pneumatic or hydraulic. If pneumatic, then it can be either operated by super-atmospheric pressure or sub-atmospheric pressure. The power device, as shown, is designed primarily for hydraulic actuation. The cylinder is closed at both ends with the forward end being connected to a conduit 13 and the rear end being connected to a conduit 14. These conduits are both connected through suitable control valve mechanism (not shown) to a source of fluid pressure and by means of the valve mechanism, fluid under pressure can be admitted to either end of the cylinder while the opposite end is evacuated. Thus, if fluid pressure is admitted ahead of piston 12 and evacuated at its rear, the piston will move to the left as viewed in Figures 2 and 9. If fluid pressure is admitted to the rear of the piston and evacuated at the front, then the piston will be moved to the right as viewed in Figure 1. Any well known control valve mechanism can be employed to accomplish the desired control. The piston 12 will be suitably packed, as shown in Figure 2, and a piston rod 15 is shown as extending through the rear wall of the cylinder, such also being suitably packed as shown.

The cylinder 11 is about half the length of the side channel 10 and is of a diameter to be positioned therein and held by suitable clamps 16. The cylinder, when in the channel, can be enclosed on the open outer side by a suitable cover plate 17 not shown in Figures 1 and 3, but disclosed in Figure 2.

In the wall control mechanism disclosed four cables are employed, as best shown in Figure 9, said cables being indicated by numerals 18, 19, 20 and 21. Each of these cables is connected at one of its ends to the wall W to be moved and the other ends are anchored to a part of the truck body. Between the wall and the anchor each cable is trained over fixed sheaves and a sheave carried by the outer end of the piston rod 15, all as will become apparent. Thus, movement of the piston in opposite directions in the cylinder will cause movement of the wall in opposite directions in the truck body, but by a distance twice the distance that the piston travels, due to the movable sheaves on the piston rod.

Figure 5:
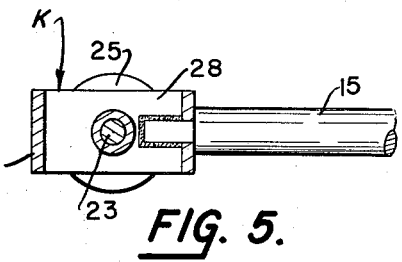
Figure 5 is a sectional view taken on the line 5—5 of Figure 4 showing further details.

As shown best in Figures 4 and 5, the outer free end of the piston rod 15 carries a block K which comprises an open frame structure 22 secured to the end of the piston and carrying a short vertical shaft 23 positioned to be at right angles to the axis of the piston rod. On this shaft are journaled four sheaves or pulleys 24, 25, 26 and 27 in a generally stacked relation with an interposed central frame partition 28.

Figure 7:
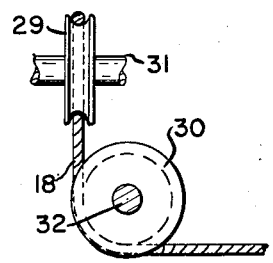
Figure 7 is a view of the sheaves at one corner of the truck body on the side opposite the cylinder showing how a cable is caused to change direction of its line of pull so as to move the movable wall or end gate longitudinally.
Figure 8:
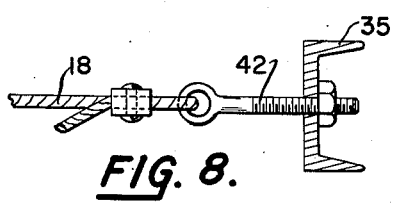
Figure 8 is a view of one of the adjustable eye bolt anchors for the cables.

Referring now to Figure 9, it is seen that cable 18 has one end fixed to the bottom corner of the movable wall W at the left side of the truck body remote from the cylinder mounting. This cable runs forwardly from the wall along the side of the body to the front left end thereof. At this corner it is trained over two sheaves 29 and 30 mounted on fixed shafts 31 and 32, said shafts being at right angles to each other, as shown in Figure 7, so that the cable 18 can run across the forward end of the truck body from the left front corner to the right front corner, as shown in Figure 9. At the right front corner of the body the cable 18 runs over a sheave 33 mounted on a vertical axis on the bottom flange of the channel 10, as shown in Figures 1, 3 and 8.

Figure 3:
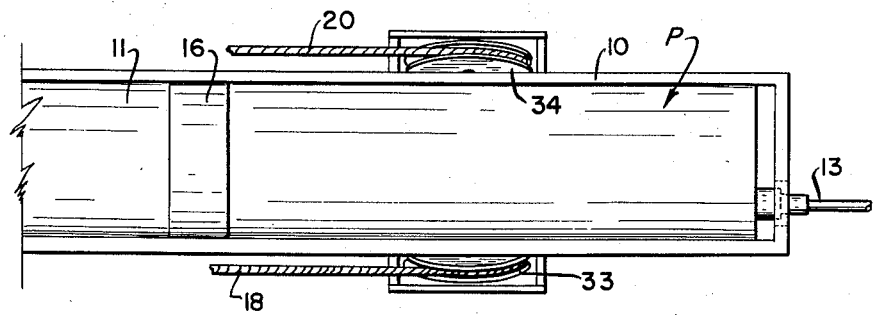
Figure 3 is an enlarged view of a part of the fluid pressure cylinder and associated sheaves mounted thereon as shown in Figure 1.

The other cable 20 which is connected to the forward right hand end of the wall extends forwardly to the front of the truck body and then runs over a sheave 34 mounted on a vertical axis on the top flange of the channel 10, all as shown in Figures 1, 3 and 9.

Both cables 18 and 20 are arranged to be pulled by the block K as the piston rod is caused to move rearwardly and to accomplish this, cable 18 is trained over sheave 27 at the bottom of the block and then forwardly to a point near the middle of the body where it passes through a suitable opening in the wall of the channel to a selected point beneath the truck body where it is anchored to a cross support 35. The connection to the support is preferably made for adjustment by an eye bolt 42, such as disclosed in detail in Figure 8. In a similar manner cable 20, after passing over sheave 34, is trained around top sheave 24 on the block K and then forwardly through a suitable hole in the channel wall to a selected point for anchoring to the cross support 35 by means of adjustable eye bolt structure like that shown in Figure 8. In the schematic view of Figure 9 only a section of the single support 35 is shown.

Figure 6:
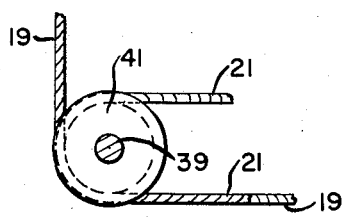
Figure 6 is a view taken on the line 6—6 of Figure 1 showing the rear fixed sheaves with which the block of sheaves cooperates.

To move the wall W rearwardly, both cables 19 and 21 are pulled by the block K as the piston is caused to move forwardly. This is accomplished by having the cable 19 at the left end of the wall extend to the left rear corner of the body where it will be trained over two sheaves rotatable on fixed shafts at right angles to each other as disclosed in Figure 9. From here the cable 19 passes to the right rear corner of the truck body and then around a sheave 38 mounted on fixed vertical shaft 39 at the rear end of the channel 10, as shown in Figure 1, 6 and 9. From here the cable is trained over an intermediate sheave 26 on the block K and then passes rearwardly to a point adjacent the sheave where it passes through the wall of the channel to a selected point on a body support 40 at which it is anchored as by the adjustable eye bolt shown in Figure 8. The other cable 21 for pulling the wall W rearwardly extends rearwardly from the right end of the wall to the right rear end of the truck body where it is trained over a sheave 41 mounted on the same vertical shaft 39 as the sheave 38. From here the cable passes around the other intermediate sheave 25 on the block K, then rearwardly to a point adjacent the sheave 41 where it passes through the wall of the channel 10 and is anchored to the cross support 40, as by the adjustable eye bolt shown in Figure 8.

From the foregoing detailed description of a structure shown, by way of example as embodying our invention, it is believed obvious as to how it operates, but nevertheless such will be briefly described. If the wall W or movable end gate is at the rear of the truck body and it is desired to move it forwardly to push material toward and/or out of the forward end of the body, fluid under pressure will be admitted through conduit 13 to the forward end of the cylinder and the rear end of the cylinder will be connected through conduit 14 so as to be evacuated. As the piston 12 moves rearwardly, the block K will also be moved rearwardly and consequently the cables 18 and 20 pulled upon and the wall W thereby moved forwardly in the truck body as the cable moves over the sheaves. Since the block K and its sheaves are moving, there will be a 1 to 2 ratio of forces transmitted and the wall will move twice as fast as the piston moves. The cables 19 and 21 will be "slackened" by movement of the block and thereby can be pulled along with the movable wall.

When it is desired to move the wall rearwardly, fluid under pressure will be admitted to the rear of the piston and evacuated from the front thereof. This causes movement of the block K forwardly and as a result the cables 19 and 21 will be pulled upon and the cables 18 and 20 "slackened." Thus, the end wall W moves rearwardly twice as fast as the piston moves and with 1 to 2 ratio of forces involved.

It will be noted that the cables can be easily held reasonably tight and equalized by the adjustable eye bolts 42 at their anchored end. The cylinder of the power unit, by being on the side of the truck body, is readily accessible for repair and well protected, because of its being in the channel 10. The channel also provides a guide for the block K. All the longitudinal forces between the movable block and the sheaves 33, 34, 38 and 41, as the block moves, will be taken in compression by the channel 10, thus assuring a strong and sturdy structure.

We are aware that modifications can be made in the particular apparatus disclosed as embodying the invention, all without departing from the fundamental principles involved, and therefore it is to be understood that the scope of the invention is not to be limited except in accordance with the structural terms and equivalents of the appended claims.

What is claimed is:

1. In combination with a vehicle body for containing material, a movable wall in the body to move the material toward either end, and fluid pressure operated means for moving the wall comprising a fixed cylinder, a piston movable in the cylinder, four cables connected at opposite ends and to opposite sides of the wall, four sheaves mounted on one end of and for movement with the piston, said four sheaves being positioned on a common axis vertical to the axis of movement of said piston, and means including anchors for the cables and fixed sheaves carried by the vehicle body for connecting the cables around the sheaves movable with the piston so that upon movement of the piston in the cylinder in one direction the wall will move in one direction and movement of the piston in the opposite direction will move the wall in an opposite direction.

2. The combination of claim 1 in which the fixed sheaves are at the four corners of the vehicle body and on that side opposite the mounting of the cylinder and piston, the sheaves at each corner being two in number and rotatable on axes at right angles to each other so as to permit cables to extend across the ends of the vehicle body.

References Cited in the file of this patent
UNITED STATES PATENTS

| | | |
|---|---|---|
| 1,315,684 | Primrose et al. | Sept. 9, 1919 |
| 1,692,872 | Sloane | Nov. 27, 1928 |
| 1,841,958 | Kendall et al. | Jan. 19, 1932 |
| 2,318,886 | Paiement | May 11, 1943 |
| 2,339,360 | Sicard | Jan. 18, 1944 |
| 2,523,916 | Paiement | Sept. 26, 1950 |